United States Patent [19]

Kruse et al.

[11] Patent Number: 5,378,780

[45] Date of Patent: Jan. 3, 1995

[54] PROCESS FOR THE PRODUCTION OF PASTE-FORMING VINYL CHLORIDE POLYMERS

[75] Inventors: Wolfgang A. Kruse, Marl; Burkhard Boeke, Haltern, both of Germany

[73] Assignee: Huls Aktiengesellschaft, Marl, Germany

[21] Appl. No.: 896,906

[22] Filed: Jun. 11, 1992

Related U.S. Application Data

[63] Continuation of Ser. No. 503,071, Mar. 29, 1990, abandoned, which is a continuation of Ser. No. 834,661, Feb. 28, 1986, abandoned, which is a continuation of Ser. No. 676,761, Nov. 30, 1984, abandoned.

[30] Foreign Application Priority Data

Dec. 3, 1983 [DE] Germany .............................. 3343766
May 11, 1984 [DE] Germany .............................. 341743-4

[51] Int. Cl.$^6$ ................................................ C08F 2/24
[52] U.S. Cl. ..................... 526/212; 526/214; 526/225
[58] Field of Search ........................ 526/212, 214, 225

[56] References Cited

U.S. PATENT DOCUMENTS

| | | | |
|---|---|---|---|
| 3,324,097 | 6/1967 | Pears | 526/212 |
| 3,551,399 | 12/1970 | Yonezu et al. | 526/212 |
| 4,029,619 | 6/1977 | Tajima et al. | 526/210 |
| 4,150,210 | 4/1979 | Anderson et al. | 226/222 |
| 4,186,259 | 6/1980 | Bush et al. | 526/212 |
| 4,273,904 | 6/1981 | Bush et al. | 526/212 |
| 4,286,081 | 8/1981 | Mikofalvy et al. | 526/212 |
| 4,292,420 | 9/1981 | Turner et al. | 526/212 |
| 4,310,649 | 1/1982 | Sjolin | 526/212 |
| 4,317,677 | 2/1983 | Morningstar | 526/212 |
| 4,631,324 | 12/1986 | Boeke et al. | 526/212 |
| 4,965,328 | 10/1990 | Boeke et al. | 526/212 |

FOREIGN PATENT DOCUMENTS 1964029 12/1969 Germany .

OTHER PUBLICATIONS

Bertil Törnell, "Recent Developments in PVC Polymerization", Polym.-Plast Technol. Eng. 27(1), pp. 1, 22, 23, 24, 25 (1988).

*Primary Examiner*—Peter Szekely
*Attorney, Agent, or Firm*—Millen, White, Zelano, & Branigan

[57] ABSTRACT

Paste-forming polymers of vinyl chloride are produced by discontinuous polymerization in the presence of a conventional predispersion of emulsifier, dispersion acid, water and optional monomer-soluble catalyst. The predispersion is prepared only with 30–80% by weight of the amount of emulsifier required in total. The remainder of the emulsifier, or a component forming the emulsifier, is added in metered amounts as an aqueous solution batchwise or continously to the polymerization mixture after a conversion of 10–60% by weight.

The thus-obtained polymers lead to pastes of an especially low viscosity, even under high shear stress, and result in open-cell plasticized foam materials having a good elastic memory capacity.

27 Claims, No Drawings

PROCESS FOR THE PRODUCTION OF PASTE-FORMING VINYL CHLORIDE POLYMERS

This application is a continuation, of application Ser. No. 07/503,071, filled Mar. 29, 1990 now abandoned, which is a continuation of Ser. No. 06/834,661 of Feb. 28, 1986 now abandoned, which is a continuation of Ser. No. 06/676,761 of Nov. 30, 1984 now abandoned.

BACKGROUND OF THE INVENTION

Continuous as well as discontinuous methods are known for the production of paste-grade polyvinyl chloride. The vinyl chloride polymer produced by the continuous process results in plastisols having low viscosities at high shear rates. However, greater amounts of emulsifier are needed for their production, leading to reduced transparency and higher water sensitivity. The vinyl chloride polymers normally obtained by continuous polymerization below the vinyl chloride saturation pressure are also inferior to the discontinuously polymerized polyvinyl chloride in regard to thermostability.

The types of polyvinyl chloride produced by the dicontinuous method can be polymerized by emulsion polymerization with markedly lower quantities of emulsifier, especially if the emulsifier is added in accordance with the method of German Patent 1,964,029 or according to the laid-open disclosure of Belgian Patent 656,985. However, in all cases, plastisols are obtained having viscosities that are higher than in continuous polymerization.

Also conventional is vinyl chloride polymerization according to the so-called microsuspension process. Plastisols from vinyl chloride polymers prepared by this process exhibit a pronouncedly dilatant behavior and thus are less suitable for being processed by the spread coating method. Besides, stable latices can be prepared only up to a solids content of about 40% by weight, which increases the spray-drying costs.

Various discontinuous methods have been known for vinyl chloride polymerization with the use of dispersing aids, in most cases fatty alcohols. The following can be cited as state of the art:

1. DOS 2,850,105
2. DOS 2,742,178 (U.S. Pat. No. 4,093,581)
3. European Patent 0,030,524
4. German Application P 32 10 891.5 (U.S. application Ser. No. 478,766 of Mar. 25, 1983)
5. German Application P 32 42 088.9 (U.S. application No. 551,033 of Nov. 14, 1983)

Polymerization according to method 1 is conducted by means of oil-soluble activators, partially with the addition of reducing agents. This process leads to products which, when processed into plastisols, exhibit a strongly dilatant flow characteristic, as can be seen from Comparative Experiment A of German Patent Application P 32 10 891.5.

The process described in (2) utilizes inorganic catalysts for the activation. Accordingly, a mixture is employed during polymerization consisting of a $C_{16}$–$C_{20}$-alkyl alcohol and an alkyl sulfate ($C_{12}$–$C_{18}$). As demonstrated by Comparative Experiments B and C of German Patent Application P 32 10 891.5, latices are obtained according to (2) which are either unstable or of a low solids content, yielding a polyvinyl chloride upon spray-drying which results in high-viscosity pastes with a pronounced pseudo-plastic flow behavior.

According to (3), a water-soluble material is first homogenized in the presence of water and emulsifier. Thereafter, the monomer and initiator are added thereto. In order to conduct the process successfully, the presence of a seed latex (stabilizing latex) is required, and thus the process is comparatively expensive.

According to (4), though low-viscosity pastes are obtained, increased technical expenditure is required. This is so because the predispersion to be added during polymerization must be prepared in a separate, heatable agitated vessel and must be heated throughout the entire polymerization procedure to above the melting point of the fatty alcohol employed. In spite of the heated action, the predispersions may change during the period of metered feeding outside of the vessel, leading to fluctuating product properties. Additionally, when processing the products prepared according to (4) into expandable plastisols with the use of chemical blowing agents, such as, for example, azodicarbonamide, foam materials are obtained after gelling which have a primarily closed-cell foam structure. This, as is known, results in foams having a lack of elastic memory capacity.

The process listed in (5) likewise requires increased technical expenditure, since a pressure homogenizer is utilized.

SUMMARY OF THE INVENTION

These objects have been achieved by a process for the production of paste-forming polymers of vinyl chloride, or mixtures of vinyl chloride with up to 30% by weight of copolymerizable monomers, by discontinuous polymerization in the presence of water-soluble or monomer-soluble catalysts and a predispersion of (a) an alkali metal salt or ammonium salt of a branched or unbranched fatty acid containing 12–18 carbon atoms, of a branched or unbranched alkylsulfonic acid containing 10–20 carbon atoms, of an alkylarylsulfonic acid containing 8–18 carbon atoms in the branched or unbranched alkyl chain, or of a sulfosuccinic acid ester containing 6–14 carbon atoms in the alcohol portion, in amounts of 0.2–3.0% by weight, based on the monomer, (b) a straight-chain or branched $C_{12}$–$C_{20}$-alkanol in amounts of 50–200% by weight, based on the tenside employed, (c) water, as well as optionally (d) a monomer-soluble catalyst, wherein the predispersion is prepared only with 30–80% by weight of the amount of emulsifier (a) (amount of tenside) required in total, and is added to the polymerization batch, whereas the remainder of the emulsifier, or of a component forming the emulsifier, is added in metered quantities batchwise or continuously as an aqueous solution to the polymerization mixture after a conversion of 10–60% of weight. Preferably, only 40–60% by weight of the amount of emulsifier required in total is utilized for preparing the predispersion. In particular, the remainder off the emulsifier can be added after a conversion of 20–60% by weight.

DETAILED DISCUSSION

The thus-obtained polymers of vinyl chloride can be utilized advantageously for the production of plasticized foam materials with the use of chemical blowing agents, since this will result in foam materials with a predominantly open-cell structure; as is known, such materials exhibit a good elastic memory capacity.

The polymers produced according to the process of this invention are especially suitable for the preparation of plastisols having a very low viscosity under low as well as high shear gradients. This affords high processing speeds when the plastisols are processed according to the spread coating process. Besides, the plastisols exhibit a very good shelf stability if the vinyl chloride polymers of this invention are employed. In the production of foam materials from corresponding plastisols and with the use of chemical blowing agents, predominantly open-cell foams having good elasticity and a good elastic memory capacity are obtained when using the vinyl chloride polymers of this invention.

It is surprising that, with the use of a predispersion with a markedly reduced amount of emulsifier and the addition of an aqueous emulsifier solution during polymerization, a stable dispersion results which leads to products of low paste viscosity. It has also been found suprisingly that chemically foamable pastes produced therefrom resulted in foam materials having an open-cell foam structure; as is known, these foam materials exhibit a very good elastic memory capacity.

It makes no difference whether the emulsifier in the emulsifier solution is added as such, or is released in situ. For example, if fatty acid salts are utilized as emulsifiers for the preparation of the predispersions, then it is possible according to the process of this invention to provide the entire fatty acid during preparation of the predispersion, but to provide only a part (i.e., 30–80%) of the stoichiometrically required amount of alkaline solution for the formation of the emulsifier. By the corresponding addition of the aqueous solution of a base, for example NaOH, KOH, ammonia, etc., during polymerization, the emulsifier can be released in the manner of a subsequent feeding of emulsifier. In this way, the expensive handling of fatty acid salt solutions can likewise be avoided. Analogous expedients can be employed in conjunction with the other emulsifiers.

The vinyl chloride polymers produced according to this process of the invention lead to pastes having very low paste viscosity.

The predispersion of water, co-emulsifier (b), and a partial amount of emulsifier (a) can be prepared directly in the polymerization reactor according to the method of this invention. In this way, additional, heatable agitated vessels as well as heatable metering vessels and metering conduits are eliminated. There is no danger of an alteration of the predispersion outside of the polymerization reactor, since the only materials added during polymerization are the tenside and/or the alkaline solution, which can be added in metered quantities without any problems.

Emulsifier sytems that can be employed include:
(a) alkali metal salts or ammonium salts of fatty acids, of alkylsulfonic acids or alkylarylsulfonic acids or sulfosuccinic acid esters in quantities of 0.2–3% by weight, preferably 0.5–1.5% by weight, based on the monomer, and
(b) a straight-chain or also branched $C_{12}$–$C_{20}$-alkyl alcohol or mixture of several such alcohols in amounts of 50–200% by weight, preferably 70–150% by weight, based on the tenside (a) employed.

Suitable alkali salts or ammonium salts of fatty acids utilizable as the emulsifier component (tenside) include those, wherein the alkyl chain contains 12–18 carbon atoms and which are branched or unbranched. The following can be used, for example: sodium laurate, sodium myristate, sodium palmitate, sodium isopalmitate, sodium stearate, etc. The corresponding potassium and ammonium salts are likewise suitable.

Alkali metal salts or ammonium salts of alkylsulfonic acids that can be employed as the emulsifier component include those wherein the alkyl residues contain 10–20 carbon atoms, preferably 14–17 carbon atoms, and which are branched or unbranched. Examples of suitable compounds include: sodium decyl sulfonate, sodium dodecyl sulfonate, sodium palmityl sulfonate, sodium stearyl sulfonate, sodium heptadecyl sulfonate, sodium arachidyl sulfonate, etc. The potassium or ammonium salts can likewise be used with analogous success. In general, mixtures of the aforementioned individual compounds will be preferred, as they are obtained in the sulfonation of industrial alkane mixtures.

Suitable alkali metal or ammonium salts of alkylarylsulfonic acids which are to be used as the emulsifier component are those wherein the alkyl chain contains 8–18 carbon atoms, preferably 10–13 carbon atoms, this chain being branched or unbranched. Examples include: sodium tetrapropylenebenzenesulfonate, sodium-p-n-dodecylbenzenesulfonate, sodium octadecylbenzenesulfonate, sodium octylbenzenesulfonate, sodium decylbenzenesulfonate, sodium tridecylbenzenesulfonate, sodium tetradecylbenzenesulfonate, sodium pentadecylbenzenesulfonate, sodium hexadecylbenzenesulfonate, etc. Preferably, mixtures of such individual compounds are employed. It is also possible to use the potassium salts or ammonium salts.

Suitable alkali metals or ammonium salts of sulfosuccinic acid esters useful as the emulsifier component are those wherein the alcohol portion contains 6–14 carbon atoms, preferably 8–10 carbon atoms, and is branched or unbranched. Suitable examples include: sodium dihexylsulfosuccinate, sodium dioctyl sulfosuccinate, sodium di(2-ethylhexyl) sulfosuccinate, sodium didecyl sulfosuccinate, sodium didodecyl sulfosuccinate, sodium diisodecyl sulfosuccinate, sodium diisododecyl sulfosuccinate, sodium tridecyl sulfosuccinate, sodium ditetradecyl sulfosuccinate, etc., and the corresponding potassium and ammonium salts. It is also possible to use mixtures of the aforementioned emulsifiers. These emulsifiers generally have the formula

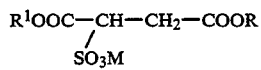

wherein R and $R^1$ are each $C_{6-14}$-alkyl; and M is ammonium or an alkali metal.

Mixtures of the four general classes of emulsifiers can also be used.

Suitable dispersion aids include straight-chain or branched $C_{12}$–$C_{20}$-alcohols, such as, for example, lauryl alcohol, myristyl alcohol, palmityl alcohol, stearyl alcohol, arachidyl alcohol, 2-hexyldecanol, 2-octyldecanol, etc. Mixtures of the above-listed alcohols can also be employed.

Components (a) and (b) of the emulsifier system should be dissolved or dispersed in water. If a monomer-soluble initiator is chosen for the polymerization, such initiator likewise can be added to the mixture. In case the melting points of the fatty alcohols lie above room temperature, the dispersion step is advantageously conducted at temperatures of 30°–70° C., i.e., above the melting temperature of the fatty alcohols.

In the selection of a suitable monomer-soluble initiator, attention must be given to preventing any marked decomposition of the initiator as early as during the dispersion step. Those initiators are employed with preference which, at the required dispersing temperature, exhibit half-life values of higher than 10 hours, preferably higher than 20 hours. If an initiator having a high half-life value is selected on account of the high melting point of a fatty alcohol employed, then the subsequent polymerization reaction should be controlled by means of suitable reducing agents. See also, e.g., the monograph of Kainer, Polyvinylchlorid und Vinylchlorid-Mischpolymerisate, Springer Verlag, Berlin, Heidelberg, N.Y., (1965), p. 46–49.

Except for the quantities of water required for the metered feeding of the emulsifier and possibly the activator, as well as reducing agents, the entire amount of the water needed for the polymerization can be charged into the reactor during preparation of the predispersion. Conventional buffer salts can be added to the water, such as, for example, sodium pyrophosphate, sodium acetate, or sodium borate.

After producing the predispersion, vinyl chloride or a mixture of vinyl chloride and copolymerizable monomers is added under agitation. After setting of the desired polymerization temperature, the polymerization reaction is started by means of the selected initiator system, and controlled by the latter. It is especially advantageous regarding latex stability to provide only 40–60% by weight of the total amount of emulsifiers when preparing the predispersion, and to add the corresponding remaining quantity as an aqueous emulsifier solution in metered amounts, batchwise or continuously starting with a polymerization conversion rate of 10–60%, preferably 20–60%, up to the end of the polymerization. The technically simplest method is the linear addition of the emulsifier solution throughout the remaining time of polymerization. However, dependent on the amount of emulsifier initially added and dependent on the conversion at the start of addition of emulsifier, it may be advantageous to choose the addition rate of emulsifier solution relative to the conversion, where the addition rate may increase or decrease with conversion.

It is also possible to provide only a portion of the monomer and to add the remainder during polymerization batchwise or continuously. Comonomers that can be used are entirely conventional, for example: vinyl acetate, vinylidene chloride, vinyl ether, acrylonitrile, acrylic acid esters, maleic acid mono- and diesters. The comonomer can be present in the copolymerized product to an extent of up to 30% by weight, preferably 1 to 20% by weight.

The ratio of monomers to water can be arbitrary, up to very high vinyl chloride concentrations (about 1:0.5 to 1:1.6). In general, it will be desirable to conduct the polymerization so that latices are obtained having a maximally high solids content of, for example, 45–50% by weight.

The final conversion, of course, should be as high as possible, and should amount to at least 90%.

Suitable water-soluble catalysts include the customary percompounds, such as, $H_2O_2$, potassium persulfuate, as well as the redox systems, as indicated, for example in Kainer, "Polyvinylchlorid und Vinylchlorid-Mischpolymerisate" [Polyvinyl Chloride and Vinyl Chloride Copolymers], Springer Publishers, 1965, pp. 46 et seq.

Furthermore, considering the respective dispersing and homogenizing temperature, monomer-soluble initiators and—if necessary—the reducing agents usually employed for a redox reaction can be utilized. Examples of monomer-soluble initiators include azo compounds, such as azobisisobutyronitrile, 2,2'-axobis(2,4-dimethylvaleronitrile); or peroxides, such as dicyclohexyl peroxydicarbonate, di-n-butyl peroxydicarbonate, dilauroyl peroxide, debenzoyl peroxide, dipropionyl peroxide, tert-butyl peroxy-2-ethylhexanoate, tert-butyl peroxybenzoate, cumyl hydroperoxide, tert-butyl hydroperoxide. Examples of reducing agents include sodium thiosulfate, sodium formaldehyde sulfoxylate, ascorbic acid, and isoascorbic acid.

The initiators can be used in customary quantities of 0.005–0.5% by weight, preferably 0.01–0.1% by weight, based on the monomer.

The polymerization temperature can be 40°–70° C.—conventionally depending on the desired molecular weight. The duration of polymerization is dependent—as in all cases—on the polymerizing temperature and the catalyst concentration and can amount to about 4–16 hours. Suitably, the agitation should be carried out with the usual peripheral velocities of 10–70 rpm and by means of the flat-blade agitators customarily employed in emulsion and/or microsuspension polymerization processes.

Unless indicated otherwise herein, all the details of the process of this invention are fully conventional, e.g., as disclosed in Ullmanns Encyclopaedie der technischen Chemie, Vol. 19, Verlag Chemie, Weinheim, Deerfield Beach (Fla.), Basel, page 346, et seq., whose disclosure is incorporated by references herein.

Without further elaboration, it is believed that one skilled in the art can, using the preceding description, utilize the present invention to its fullest extent. The following prefered specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A 6 $m^3$ agitated autoclave is charged with 1,600 kg of demineralized water of a temperature of 60° C. Under agitation, 11 kg of sodium alkylbenzenesulfonate (mixtures of $C_{10}$–$C_{13}$-alkylbenzenesulfonates), 22 kg of stearyl alcohol, as well as 3.7 kg of monosodium phosphate are added thereto. After exclusion of atmospheric oxygen, 1,800 kg of vinyl chloride is added. The mixture is set at 52° C., the agitator speed is adjusted to 10 rpm. By the metered feeding of a 0.5% aqueous $H_2O_2$ solution and a 0.2% aqueous ascorbic acid solution, the reaction is started up. The further metering of the catalyst components is set so that the polymerization temperature of 52° C. remains constant at almost full cooling capacity (jacket: 600,000 kJ/h; reflux condenser: 120,000 kJ/h). One hour after startup of the reaction, 48 kg of a 20% aqueous solution of sodium alkylbenzenesulfonate is added at a metering rate of 8 kg/h. The time from the beginning of the reaction to pressure drop is 6 hours.

The dispersion (solids content 46.9%) is worked up in a spray-drying installation. The inlet temperature of the dryer air is 160° C., the outlet temperature is 60° C. Otherwise, the working-up process takes place as described in DAS 2,146,146. A paste is prepared from 100 parts by weight of the thus-obtained polyvinyl chloride powder and from 60 parts by weight of di(2-ethylhexyl) phthalate (DOP), and the viscosity thereof is measured after a storage period of 2 and 24 hours at various shear rates in a rotation rheometer (instrument: Rheomat 30 by Contraves AG, Zuerich). The thickening factor TF is a measure for the shelf life of the paste. This factor is determined from the quotient of the viscosity value, taken after a storage period of 24 hours, divided by the viscosity value taken after 2 hours at a shear rate of $D = 1\ s^{-1}$. Table 1 shows the paste viscosities at various shear rates, as well as the thickening factor TF.

In order to test the blowing properties of the expanded polyvinyl chloride, a paste is prepared according to 10 the following formulation:

| | |
|---|---|
| 100 parts | polyvinyl chloride |
| 40 parts | di(2-ethylhexyl) phthalate |
| 20 parts | benzyl butyl phthalate |
| 3 parts | azodicarbonamide |
| 1.5 parts | Cd/Zn stabilizer |

The paste is de-aerated for one hour under vacuum. After a storage period of another 24 hours, the paste is knife-coated on a release paper with an application thickness of 1 mm and, with a residence time of 1.5 minutes, is gelled and expanded at 200° C. in a gelling tunnel.

The thus-obtained foam material is evaluated with respect to foam density and proportion by volume of closed and open cells. The latter is determined as follows: portions having a basal surface area of 100 cm² are punched out from the resultant, expanded specimens; these portions are introduced into a desiccator filled with water and evacuated so that the air is removed from the open cells. After aeration and removal of the specimen from the desiccator, the open cells have filled with water. By weighing the thus-absorbed quantity of water, the proportion by volume of the open cells can be calculated. The volume proportion of the plasticized polyvinyl chloride results from its density and the density of the foam. The percentage volume proportion of the closed cells then is obtained as the difference between 100% and the sum total of the volume proportion of open cells and plasticized polyvinyl chloride. The volume proportions of closed and open cells can be derived from Table 2.

EXAMPLE 2

A 6 m³ agitated autoclave is charged with 1,600 kg of demineralized water of a temperature of 60° C. Under agitation, 22 kg of a mixture is added consisting of approximately equal parts of cetyl and of stearyl alcohol, 3 kg of sodium acetate, 9.25 kg of sodium di-2-ethylhexyl sulfosuccinate, as well as 1.5 kg of tert-butyl perbenzoate. After excluding atmospheric oxygen, 1,800 kg of vinyl chloride is added. This mixture is set at a temperature of 52° C.; the agitator speed is set at 10 rpm. By the metered feeding of a 0.2% ascorbic acid solution, the reaction is started up. Further metered feeding is adjusted so that the polymerization temperature of 52° C. is maintained with an almost fully exploited cooling capacity. Two hours after beginning of the reaction, metered feeding is started of 105 kg of a 10% aqueous solution of sodium di-2-ethylhexyl sulfosuccinate at a rate of 15 kg/h. The time from startup of reaction to pressure drop amounts to 8 hours.

After the reaction is finished, the solids content of the dispersion is 45.6%. The dispersion is worked up as described in Example 1. The paste viscosities of the powder, made into a paste with DOP in a ratio of 100:60, and the thickening factor of the paste can be seen from Table 1. Expansion is effected as set forth in Example 1. The results can be derived from Table 2.

EXAMPLE 3

A 6 m³ agitated autoclave is charged with 1,600 kg of demineralized water of a temperature of 60° C. Under agitation, the water is combined with 13.5 kg of lauric acid, 7.5 kg of sodium lauryl sulfate, 22 kg of stearyl alcohol, as well as 1.2 kg of sodium hydroxide. After excluding atmospheric oxygen, 1,800 kg of vinyl chloride is added. The mixture is adjusted to a temperature of 52° C., the agitator speed to 10 rpm. The reaction is started up with a 0.5% aqueous $H_2O_2$ solution and a 0.2% aqueous sodium formaldehyde sulfoxylate solution. One-half hour after beginning of the reaction, 80 kg of a 3% aqueous sodium hydroxide solution is added in metered quantities within 4 hours.

The dispersion (solids content 47.1%) is worked up is in Example 1. The pH value of the aqueous product extract is adjusted to 5.5 with the aid of a 6% oxalic acid solution dispensed in the spraying installation together with the product (mode of operation according to German Patent 2,531,780, Example 3). The paste viscosity, with DOP being incorporated into the paste with a ratio of 100:60, as well as the paste shelf life, can be seen from Table 1.

Blowing is carried out as indicated in Example 1. The results are set forth in Table 2.

EXAMPLE 4

A 6 m³ agitated autoclave is charged with 1,600 kg of demineralized water of a temperature of 60° C. Under agitation, 16.5 kg of sodium alkylbenzenesulfonate (mixtures of $C_{10}$-$C_{13}$-alkylbenzenesulfonates), 22 kg of stearyl alcohol, as well as 3.7 kg of monosodium phosphate are added. After atmospheric oxygen has been excluded, 1,800 kg of vinyl chloride is added thereto. The mixture is set at 52° C., the agitator speed at 10 rpm. The reaction is started up by the metered feeding of a 0.5% aqueous $H_2O_2$ solution and a 0.2% aqueous ascorbic acid solution. The further metering of the catalyst components is adjusted so that the polymerizing temperature of 52° C. remains constant with almost full cooling capacity (jacket: 600,000 kJ per hour; reflux condenser: 120,000 kJ per hour). One hour after beginning of the reaction, 19.5 kg of a 20% aqueous solution of sodium alkylbenzenesulfonate is added in metered amounts at a rate of 8 kg/h. The time from beginning of the reaction to pressure drop is 6 hours.

The dispersion (solids content 47.6%) is worked up in a spray-drying installation. The inlet temperature of the dryer air is 160° C., the outlet temperature is 60° C. Otherwise, working-up proceeds as described in DAS 2,146,146. A paste is prepared from 100 parts by weight of the resultant polyvinyl chloride powder and from 60 parts by weight of di(2-ethylhexyl) phthalate (DOP), and the viscosity of the paste is measured after 2 and 24 hours of storage at various shear rates in a rotation rheometer (instrument: Rheomat 30 of Contraves AG, Zuerich). The thickening factor TF is a measure for the shelf stability of the paste. This factor is determined from the quotient of the viscosity value, taken after a storage period of 24 hours, divided by the viscosity value taken after 2 hours, at a shear rate of $D=1$ s$^{-1}$. Table 1 shows the paste viscosities at various shear rates as well as the thickening factor TF.

In order to test the blowing properties of the expanded polyvinyl chloride, a paste is prepared according to the following formulation:

| | |
|---|---|
| 100 parts | polyvinyl chloride |
| 40 parts | di(2-ethylhexyl) phthalate |
| 20 parts | benzyl butyl phthalate |
| 3 parts | azodicarbonamide |
| 1.5 parts | Cd/Zn stabilizer |

The paste is de-aerated for one hour under vacuum. After a storage period of another 24 hours, the paste is knife-coated on a release paper with an application thickness of 1 mm and, with a residence time of 1.5 minutes, gelled and expanded at 200° C. in a gelling tunnel.

The foam density and the volume proportion of closed and open cells are determined in the resultant foam material. The volume proportion is determined as follows: Portions having a basal surface area of 100 cm$^2$ are punched out from the expanded specimens obtained above; these portions are transferred into a desiccator filled with water and evacuated so that the air is removed from the open cells. After aeration and withdrawal of the specimen from the desiccator, the open cells have filled with water. By weighing the thus-absorbed quantity of water, the volume proportion of open cells can be calculated. The volume proportion of plasticized polyvinyl chloride results from its density and the density of the foam. The percentage volume proportion of the closed cells then is obtained as the difference between 100% and the sum total of volume proportion of open cells and plasticized polyvinyl chloride. The volume proportions of closed and open cells can be derived from Table 2.

EXAMPLE 5

A 6 m$^3$ agitated autoclave is charged with 1,600 kg of demineralized water having a temperature of 60° C. The water is combined under agitation with 16.7 kg of myristic acid, 22 kg of stearyl alcohol, as well as 2.25 kg of sodium hydroxide. After exclusion of atmospheric oxygen, 1,800 kg of vinyl chloride is added. The mixture is adjusted to a temperature of 52° C., the agitator speed is set at 10 rpm. The reaction is started up with a 0.5% aqueous H$_2$O$_2$ solution and a 0.2% aqueous sodium formaldehyde sulfoxylate solution. One-half hour after beginning of the reaction, 71 kg of a 2% aqueous sodium hydroxide solution is added in metered amounts within 4 hours.

The dispersion (solids content 47.1%) is worked up as described in Example 4. The pH value of the aqueous product extract is set at 5.5 with the aid of a 6% oxalic acid solution concomitantly sprayed in the spraying installation (mode of operation in accordance with German Patent 2,531,780, Example 3). Table 1 shows the paste viscosity, the paste containing DOP in a ratio of 100:60, as well as the paste shelf stability.

Expansion is carried out as described in Example 4. The results are listed in Table 2.

COMPARATIVE EXAMPLE A (German Application P 32 42 088.9 (U.S. Ser. No. 551,033))

A 2 m$^3$ vessel is charged with 1,650 kg of demineralized water of a temperature of 60° C. Under agitation, 18 kg of sodium alkylbenzenesulfonate (mixtures of C$_{10}$–C$_{13}$-alkylbenzenesulfonates) and 22 kg of stearyl alcohol are added thereto. The mixture is passed through a single-stage piston pump homogenizer. The pressure in the homogenizing head is 180 bar; the recycle time (setting time) is 5 minutes. The homogenized mixture is conducted, under exclusion of atmospheric oxygen, to a 6 m$^3$ agitated autoclave which can be cooled or heated by way of the jacket. (The autoclave is additionally equipped with a reflux condenser.) The mixture is combined with 1,800 kg of vinyl chloride and heated to 52° C. The agitator speed is set at 10 rpm. By the metered feeding of a 0.5% aqueous H$_2$O$_2$ solution and a 0.2% aqueous ascorbic acid solution, the reaction is started up. The further feeding is set so that the polymerization temperature of 52° C. remains constant with an almost complete cooling capacity. The time to pressure drop is 5 hours.

The dispersion (solids content 47.1%) is worked up as set forth in Example 1.

A paste is prepared from 100 parts by weight of the thus-obtained polyvinyl chloride powder and from 60 parts by weight of di(2-ethylhexyl) phthalate (DOP), and the viscosity of the paste is measured in a rotation rheometer at various shear rates after 2 and 24 hours of storage. The paste viscosities and the thickening factor can be derived from Table 1 Blowing is conducted as in Example 1. The results are shown in Table 2.

COMPARATIVE EXAMPLE B

The procedure of Comparative Example A is repeated, but using additionally 1.5 kg of tert-butyl perbenzoate during preparation of the predispersion, and employing as the emulsifier 18 kg of sodium di-2-ethylhexyl sulfosuccinate.

The polymerization reaction is started up by means of a 0.2% aqueous ascorbic acid solution and proceeds thus in a controlled fashion.

After the reaction is finished, the solids content of the dispersion is 46.5%. The dispersion is worked up as described in Example 1. The paste viscosities of the powder, made into a paste with DOP in a ratio of 100:60, and the thickening factor of the paste can be derived from Table 1.

Blowing is performed as in Example 1. The results are found in Table 2.

COMPARATIVE EXAMPLE C

The procedure of Comparative Example B is followed, but using as the emulsifier a mixture of 15 kg of sodium laurate and 7.5 kg of sodium lauryl sulfate. Furthermore, 0.9 kg of sodium hydroxide is added to the water. The reaction is started and controlled with a 0.5% aqueous H$_2$O$_2$ solution and a 0.2% aqueous sodium formaldehyde sulfoxylate solution.

The dispersion is worked up as described in Example 3 (solids content 46.3%). The paste viscosities of the powder, made into a paste with DOP in a ratio of 100:60, as well as the paste storage stability can be seen from Table 1.

Blowing is performed as in Example 1. The results are compiled in Table 2.

COMPARATIVE EXAMPLE D (German Application P 32 10 891.5 (U.S. Ser. No. 478,766))

A 50 liter vessel is charged with 17 kg of water at 60° C. Under agitation, the water is combined with 4.3 kg of a 21% aqueous sodium alkylbenzenesulfonate solution (mixture of $C_{10}$–$C_{13}$-alkylbenzenesulfonates) and 1.3 kg of an aqueous sodium salt solution of the sulfosuccinic acid diethylhexyl ester (70% by weight), as well as 1.8 kg of a mixture of about equal parts of cetyl alcohol and of stearyl alcohol.

Under exclusion of atmospheric oxygen, an agitated autoclave having a capacity of 500 l, equipped with heating and cooling units, is charged with 120 l of demineralized water, 0.2 l of the previously prepared emulsifier solution, 260 g of monosodium phosphate. The mixture is heated to 52° C. To this mixture is added 45 kg of vinyl chloride. By metered feeding of a 0.5% aqueous $H_2O_2$ solution and a 0.2% aqueous ascorbic acid solution in respectively equal parts, the reaction is started up.

The feeding of activator is adjusted so that the polymerization temperature of 52° C. remains constant with an almost full cooling capacity. During the further course of polymerizing, another 135 kg of vinyl chloride is fed in metered amounts within 3 hours. The remainder of the emulsifier solution is distributed as follows during the reaction period:

| Time (h)       | 1   | 2   | 3    | 4    |
|----------------|-----|-----|------|------|
| Emulsifier (l) | 0.5 | 5.8 | 10.3 | 10.7 |

The dispersion (solids content 48.5%) is worked up as indicated in Example 3. The paste viscosities of the powder, made into a paste with DOP in a ratio of 100:60, as well as the paste shelf stability can be seen from Table 1.

Blowing is executed as in Example 1. The results are set forth in Table 2.

TABLE 1

| | Paste Viscosity (d Pas) | | | | | | | | Conc. of Emulsifier System Based on Vinyl Chloride (%) |
|---|---|---|---|---|---|---|---|---|---|
| | $D = 0.3\,s^{-1}$ | | $D = 1\,s^{-1}$ | | $D = 10\,s^{-1}$ | | $D = 100\,s^{-1}$ | | |
| | 2 h | 24 h | 2 h | 24 h | 2 h | 24 h | 2 h | 24 h | TF | |
| Example 1 | 43 | 54 | 31 | 38 | 25 | 30 | 29 | 33 | 1.2 | 2.4 |
| Example 2 | 56 | 72 | 38 | 42 | 33 | 34 | 38 | 41 | 1.1 | 2.3 |
| Example 3 | 72 | 110 | 51 | 66 | 52 | 60 | 75 | 80 | 1.3 | 2.4 |
| Example 4 | 45 | 57 | 32 | 41 | 26 | 34 | 31 | 36 | 1.28 | |
| Example 5 | 75 | 118 | 46 | 58 | 33 | 45 | 36 | 48 | 1.26 | |
| Comp. Ex. A | 62 | 79 | 36 | 45 | 24 | 30 | 24 | 31 | 1.3 | 2.2 |
| Comp. Ex. B | 53 | 66 | 39 | 45 | 35 | 36 | 40 | 42 | 1.2 | 2.2 |
| Comp. Ex. C | 240 | — | 180 | — | 130 | — | 120 | — | No longer measurable after 24 h | 2.4 |
| Comp. Ex. D | 72 | 130 | 55 | 100 | 44 | 80 | 41 | 77 | 1.8 | 2.0 |

Interpretation of Table 1

As can be seen from the measured viscosities, the process of this invention also shows very low paste viscosities as the result. As demonstrated by Comparative Example C, only this makes it possible to produce pastes that can be processed. Besides, the storage stability of the pastes is better than in the comparative examples.

TABLE 2

| | Foam Properties | |
|---|---|---|
| | Volume Proportion Open Cells (%) | Volume Proportion Closed Cells (%) |
| Example 1 | 64.0 | 15.1 |
| Example 2 | 48.1 | 20.2 |
| Example 3 | 60.9 | 14.9 |
| Example 4 | 61.2 | 17.4 |
| Example 5 | 58.5 | 18.2 |
| Comp. Ex. A | 2.0 | 75.6 |
| Comp. Ex. B | 15.6 | 54.1 |
| Comp. Ex. C | 2.7 | 75.1 |
| Comp. Ex. D | 5.1 | 70.4 |

As apparent from the above, the polymers produced according to this invention make it possible to obtain foam materials having a predominantly open-cell structure which, as is known, show a good elastic memory capacity.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for the production of paste-forming polymer of vinyl chloride or copolymer of vinyl chloride with up to 30% by weight of a copolymerizable monomer, by discontinuous polymerization in the presence of an effective amount of a monomer-soluble catalyst and a predispersion consisting of,
    (a) 0.2–3.0% by weight, based on the amount of monomer, of an emulsifier component which is an alkali metal salt or ammonium salt of a fatty acid of 12–18 carbon atoms, an alkylsulfonic acid of 10—20 carbon atoms, an alkylbenzene-sulfonic acid of 8–18 carbon atoms in the alkyl chain, or a sulfosuccinic acid ester of 6–14 carbon atoms in the alcohol portion,
    (b) 50–200% by weight, based on the amount of emulsifier (a) employed, of a $C_{12}$–$C_{20}$-alkanol,
    (c) water, and (d) optionally the monomer-soluble catalyst, when used, the improvement wherein sad predispersion is prepared with only 30–80% by weight of the amount of emulsifier (a) used in total, and said discontinuous polymerization consists of
polymerizing the monomers, in the presence of said predispersion, a monomer-soluble catalyst, optionally at least one reducing agent, and optionally at least one buffer salt, optionally adding additional monomer, batchwise or continuously, during polymerization, optionally adding at least one activator by metered addition during polymerization, optionally adding at least one reducing agent during polymerization, adding additional catalyst by metered addition during polymerization, and adding the remainder of the emulsifier, or of a precomponent forming the emulsifier, by itself in metered quantities, batchwise, or continuously, as an aqueous solution to the polymerization mixture after a conversion of 10–60% by weight has been reached.

2. In a process for the production of paste-forming polymer of vinyl chloride or copolymer of vinyl chloride with up to 30% by weight of a copolymerizable monomer, by discontinuous polymerization in the presence of an effective amount of a monomer-soluble catalyst and a predispersion consisting of, (a) 0.2–3.0% by weight, based on the amount of monomer, of an emulsifier component which is an alkali metal salt or ammonium salt of a fatty acid of 12–18 carbon atoms, an alkylsulfonic acid of 10–20 carbon atoms, an alkylbenzene-sulfonic acid of 8–18 carbon atoms in the alkyl chain, or a sulfosuccinic acid ester of 6–14 carbon atoms in the alcohol portion, (b) 50–200% by weight, based on the amount of emulsifier (a) employed, of a $C_{12}$–$C_{20}$-alkanol, (c) water, and (d) the monomer-soluble catalyst, when used, the improvement wherein said predispersion is prepared with only 30–80% by weight of the amount of emulsifier (a) used in total, and said discontinuous polymerization consists of
polymerizing the monomers, in the presence of said predispersion containing said monomer-soluble catalyst, optionally at least one reducing agent, and optionally at least one buffer salt, optionally adding additional monomer, batchwise or continuously, during polymerization, optionally adding at least one activator by metered addition during polymerization, optionally adding at least one reducing agent during polymerization, adding additional catalyst by metered addition during polymerization, and adding the remainder of the emulsifier, or of a precomponent forming the emulsifier, by itself in metered quantities, batchwise, or continuously, as an aqueous solution to the polymerization mixture after a conversion of 10–60% by weight has been reached.

3. A process according to claim 1, wherein polymerization of said monomers is conducted in the presence of said predispersion, said monomer-soluble catalyst, at least one reducing agent, and optionally at least one buffer salt.

4. A process according to claim 2, wherein polymerization of said monomers is conducted in the presence of said predispersion containing said monomer-soluble catalyst, at least one reducing agent, and optionally at least one buffer salt.

5. A process according to claim 3, wherein said at least one reducing agent is ascorbic acid.

6. A process according to claim 4, wherein said at least one reducing agent is ascorbic acid.

7. A process of claim 1, wherein only 40–60% by weight of the amount of emulsifier used in total is utilized for preparation of the predispersion.

8. A process of claim 1, wherein the predispersion is added directly to the polymerization reactor before commencement of the polymerization.

9. A process of claim 1, wherein all of the salt of a fatty acid is added to the predispersion but only 30–80% of the alkaline reagent required to release the active fatty acid per se is added thereto, and subsequently the final total amount of emulsifier required is generated by metering in of additional alkaline reagent.

10. A process of claim 1, wherein emulsifier component (a) is sodium decyl sulfonate, sodium dodecyl sulfonate, sodium palmityl sulfonate, sodium stearyl sulfonate, sodium heptadecyl sulfonate, or sodium arachidyl sulfonate.

11. A process of claim 1, wherein emulsifier component (a) is an alkali metal or ammonium salt of a ($C_{10}$–$C_{13}$-alkyl) benzenesulfonic acid.

12. A process of claim 1, wherein emulsifier component (a) is sodium tetrapropylene benzenesulfonate, sodium p-n-dodecyl benzenensulfonate, sodium octadecyl benzenesulfonate, sodium octyl benzene sulfonate, sodium decyl benzenesulfonate, sodium tridecyl benzenesulfonate, sodium tetradecyl benzenesulfonate, sodium pentadecyl benzenesulfonate, or sodium hexadecyl benzenesulfonate.

13. A process of claim 1, wherein emulsifier component (a) is an alkali metal or ammonium salt of the sulfonate group of a sulfonated succinic acid alkyl ester wherein each alkyl ester group is of 8–10 C-atoms.

14. A process of claim 1, wherein emulsifier component (a) is sodium dihexyl sulfosuccinate, sodium dioctyl sulfosuccinate, sodium di-2-ethyl-hexyl sulfosuccinate, sodium didecyl sulfosuccinate, sodium didodecyl sulfosuccinate, sodium diisodecyl sulfosuccinate, sodium diisododecyl sulfosuccinate, sodium ditridecyl sulfosuccinate, or sodium ditetradecyl sulfosuccinate.

15. A process of claim 1, wherein emulsifier component (a) is a mixture of said salts.

16. A process of claim 1, wherein component (b) is lauryl alcohol, myristyl alcohol, palmityl alcohol, stearyl alcohol, arachidyl alcohol, 2-hexadecanol, or 2-octyldodecanol.

17. A process of claim 1, wherein emulsifier component (a) is sodium salt.

18. A process of claim 1, wherein 1–20 wt. % of a comonomer is employed and is vinyl acetate, vinylidene chloride, vinyl ether, acrylonitrile, or an acrylic acid ester.

19. A process of claim 1, wherein the weight ratio of monomers to water is 1:0.5 to 1:1.6.

20. A process of claim 1, wherein the polymerization temperature is 40°–70° C.

21. A process of claim 1, wherein component (a) is of the formula

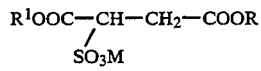

wherein R and R[1] are each $C_{6\text{-}14}$-alkyl; and M is ammonium or an alkali metal.

22. A polyvinyl chloride polymer prepared by the process of claim 1.

23. In a polyvinyl chloride polymer based paste, the improvement wherein the polyvinyl chloride polymer is that of claim 22.

24. In a plasticized foam material prepared by treating a polyvinyl chloride polymer based paste with a chemical blowing agent, the improvement wherein the paste is that of claim 23.

25. A process of claim 1, wherein the remainder of the emulsifier is added after a conversion of 20–60% by weight has been reached.

26. A process of claim 7, wherein the remainder of the emulsifier is added after a conversion of 20–60% by weight has been reached.

27. A process of claim 1, wherein the predispersion is prepared with at least 53% by weight of the amount of emulsifier (a).

* * * * *